United States Patent Office 3,850,944
Patented Nov. 26, 1974

3,850,944
5-(3'-PYRIDYL)-2-MERCAPTOIMIDAZOLE AND DERIVATIVES THEREOF
Michio Tanaka, Omiya, Katsuyuki Ohtsuka, Kitakatsu-shika, Masayoshi Obata, Omiya, Koji Amemiya, Tokyo, Katsumasa Saga, Funabashi, and Sadaaki Kano and Teru Kumada, Tokyo, Japan, assignors to Kaken Chemical Co., Ltd., Tokyo, Japan
No Drawing. Filed July 27, 1973, Ser. No. 383,120
Claims priority, application Japan, July 29, 1972, 47/75,522
Int. Cl. C07d 31/50
U.S. Cl. 260—294.8 G        2 Claims

ABSTRACT OF THE DISCLOSURE

5 - (3'-Pyridyl)-2-mercaptoimidazole and derivatives thereof having the formula

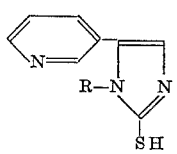

wherein R represents hydrogen, lower alkyl, lower alkenyl, phenyl, a lower alkyl substituted phenyl group, lower alkoxy or a halogen atom are prepared by the cyclic condensation of RNCS wherein R is defined as above with 3-pyridyl-aminomethylketone. The compounds are useful as anti-inflammatory agents.

BACKGROUND OF THE INVENTION

Field of the Invention

This invention relates to the compound: 5-(3'-pyridyl)-2-mercaptoimidazole, derivatives thereof and the preparation thereof.

Description of the Prior Art

It is known that certain types of 2-mercaptoimidazole derivatives possess antiinflammatory effects. However, the antiinflammatory effects exhibited by the prior art compounds are not satisfactory especially since most of them exhibit undesirable hypnotic side effects when they are used as antiinflammatory agents.

A need, therefore, exists for 2-mercaptoimidazole derivatives which possess sufficient antiinflammatory effects without having hypnotic or sedative effects. It has been found that certain 2-mercaptoimidazole derivatives containing a pyridyl group in the 5-position exhibit the desired effects.

SUMMARY OF THE INVENTION

Accordingly, one object of this invention is to provide 5-(3'-pyridyl)-2-mercaptoimidazole and derivatives thereof which exhibit satisfactory antiinflammatory effects without showing any hypnotic effects.

Briefly, this object and other objects of the invention as hereinafter will become more readily apparent can be attained by 5-(3'-pyridyl)-2-mercaptoimidazole and derivatives thereof having the formula

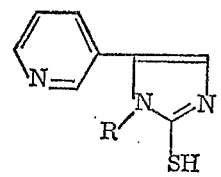

wherein R represents hydrogen, lower alkyl, lower alkenyl, phenyl, a lower alkyl substituted phenyl group, lower alkoxy or a halogen atom.

DESCRIPTION OF THE PREFERRED EMBODIMENTS

The compound, 5 - (3'-pyridyl)-2-mercaptoimidazole and derivatives thereof can be prepared by reacting a compound having the formula

RNCS        (2)

wherein R represents hydrogen, lower alkyl, lower alkenyl, phenyl, a lower alkyl substituted phenyl group, lower alkoxy or a halogen atom with 3-pyridyl-aminomethyl ketone in a cyclic condensation reaction. (The modifying term "lower" throughout this specification means those hydrocarbon groups which contain from 1–6 carbon atoms.) The compounds can also be shown in the tautomeric thioketone form instead of the thiol form shown in formula (1). In the preparation of the compounds, solvents such as pyridine, lower alcohols, and the like can be used. When 3-pyridyl-aminomethyl ketone is used in the reaction as a salt, it is preferable to use an alkaline solvent such as pyridine or some other suitable solvent in the presence of an alkaline compound.

The antiinflammatory effects of the mercaptoimidazole compounds of this invention were tested by the procedure disclosed in the Nippon Pharmacology Journal, 56, 575 (1960). The procedure constitutes the oral administration of a sample of the mercaptoimidazole drug to a Wistar male rat having a body weight of 150–180 g. One hour after the administration of the drug a 1% carrageenin solution is subcutaneously injected into the rat and the increase in the edematous volume before and after the injection of the antiinflammatory material is measured. The edema inhibition rate is determined from the volumetric data obtained by the following equation.

edema inhibition (percent) rate $$= \frac{\text{average volume increase of control} - \text{average volume increase of treated object}}{\text{average volume increase of contol}} \times 100$$

A dose-response curve is formed by plotting the following dosage data: 100 mg./kg., 200 mg./kg., 400 mg./kg. against the edema inhibition rate exhibited by each dose. From the graph can be determined the dosage for the 50% edema inhibition rate ($ED_{50}$). The results of the edema inhibition rate as a function of carrageenin exposure is shown in Table I.

TABLE I

| R | Dose, gm./kg. (p.o.) | Edema inhibition rate (percent) |
|---|---|---|
| H | 200 | 38.4 |
| $CH_3-$ | 200 | 58.8 |
| $3H_3 3H_2-$ | 200 | 52.6 |
| $CH_3CH_2CH_2-$ | 200 | 37.1 |
| $CH_2=CHCH_2-$ | 200 | 49.1 |
| phenyl | 200 | 37.0 |
| phenyl-$CH_2CH_2-$ | 200 | 32.6 |
| o-chlorophenyl | 200 | 25.3 |
| p-methylphenyl | 200 | 29.0 |
| o-methoxyphenyl | 200 | 43.5 |

As shown in Table II, a comparison between four mercaptoimidazole derivatives of this invention and four commercially available antiinflammatory agents is presented by the determination of the 50% edema inhibition rates ($ED_{50}$) of each compound.

TABLE II

| | R group | $ED_{50}$ |
|---|---|---|
| 5-(3'-pyridyl)-2-mercaptoimidazole. | $CH_3-$ | 120 |
| | o-methoxyphenyl | 250 |
| | $CH_2=CHCH_2-$ | 230 |
| | $CH_3 \cdot CH_2-$ | 210 |
| Reference | Aminopyrin | 240 |
| | Phenylbutazone | 150 |
| | Benzidamine hydrochloride. | 200 |
| | Thienolydine hydrochloride. | 390 |

The tests conducted on the mercaptoimidazole compounds of the invention show the excellent antiinflammatory properties which they possess.

Having generally described this invention, a further understanding can be obtained by reference to certain specific examples which are provided herein for purpose of illustration only and are not intended to be limiting unless otherwise specified.

EXAMPLE 1

A 7.2 amount of methylisocyanate and 4.2 g. of 3-pyridyl-amino-methylketone were added to 200 ml. of pyridine and the stirred mixture was cooled with ice for two hours. The cooled mixture was heated at 80–85° C. with stirring for 3 hours, and then was concentrated to a viscous solution. A 60 ml. quantity of water was added to the remaining product and a sodium carbonate solution was added to adjust the solution to a pH of 8.5. The solution was extracted with three 40 ml. portions of chloroform. The extracts were combined, dried with sodium sulfate and the chloroform was evaporated. The residual product was crystallized twice from ethyl alcohol and 2.5 g. of pale yellow crystals of 1-methyl-2-mercapto-5-(3'-pyridyl)-imidazole having a melting point of 214–218° C. were obtained.

EXAMPLE 2

A 5.4 g. amount of phenylisothiocyanate, 4.2 g. of 3-pyridyl-amino-methylketone hydrochloride and 2.62 g. of sodium bicarbonate were added to about 200 ml. of isopropyl alcohol and the stirred mixture was cooled with ice for 2 hours. The cooled mixture was heated at 45–50° C. with stirring for about 2 hours, and was further heated at 80–85° C. for about 3 hours. The mixture was concentrated to a viscous solution, and was treated by the procedure of Example 1 whereby 2.3 g. of crystals of 1-phenyl-2 - mercapto - 5 - (3' - pyridyl) - imidazole having a melting point of 244–245.5° C. were obtained.

EXAMPLES 3–15

The procedure of Example 1 was followed in each instance except that compounds having the formula RNCS were used, wherein the R group varied in each instance. The compounds obtained are shown in Table III.

TABLE III

| Example | R | Product | Melting point (°C.) |
|---|---|---|---|
| 3 | Benzyl | 1-benzyl-2-mecapto-5-(3'-pyridyl)-imidazole. | 201–203 |
| 4 | Phenethyl | 1-phenethyl-2-mercapto-5-(3'-pyridyl)-imidazole. | 173–174 |
| 5 | O-chlorophenyl | 1-(o-chlorophenyl)-2-mercapto-5-(3'-pyridyl) imidazole. | 244–245 |
| 6 | P-chlorophenyl | 1-(p-chlorophenyl)-1-mercapto-5-(3'-pyridyl)-imidazole. | >250 |
| 7 | O-methylphenyl | 1-(o-methylphenyl)-2-mercapto-5-(3'-pyridyl)-imidazole. | 217–219 |
| 8 | M-methylphenyl | 1-(m-methylphenyl)-2-mercapto-5-(3'-pyridyl)-imidazole. | 238–239.5 |
| 9 | P-methylphenyl | 1-(p-methylphenyl)-2-mercapto-5-(3'-pyridyl)-imidazole. | 1 262 |
| 10 | O-methoxyphenyl | 1-(o-methoxyphenyl)-2-mercapto-5-(3'-pyridyl)-imidazole. | 241–242 |
| 11 | M-methoxyphenyl | 1-(m-methoxyphenyl)-2-mercapto-5-(3'-pyridyl)-imidazole. | 199–200.5 |
| 12 | P-methoxyphenyl | 1-(p-methoxyphenyl)-2-mercapto-5-(3'-pyridyl)-imidazole. | >240 |
| 13 | $CH_2=CHCH_2$ | 1-allyl-2-mercapto-5-(3'-pyridyl)-imidazole. | 164–165.5 |
| 14 | Ethyl | 1-ethyl-2-mercapto-5-(3'-pyridyl)-imidazole. | 158–161 |
| 15 | N-propyl | 1-n-propyl-2-mercapto-5-(3'-pyridyl)-imidazole. | 161–165 |

1 Decomposition.

Having now fully described this invention, it will be apparent to one of ordinary skill in the art that many changes and modifications can be made thereto without departing from the spirit or scope of the invention as set forth herein.

What is claimed as new and intended to be covered by Letters Patent is:

1. 5 - (3' - Pyridyl) - 2 - mercaptoimidazole and derivatives thereof having the formula

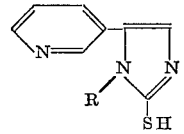

wherein R represents hydrogen, lower alkyl, allyl, phenyl, a lower alkyl substituted phenyl group, lower alkoxy or a halogen atom.

2. The 5 - (3' - pyridyl) - 2 - mercaptoimidazole compound of Claim 1 which is selected from the group consisting of:
2-mercapto-5-(3'-pyridyl)-imidazole,
1-methyl-2-mercapto-5-(3'-pyridyl)-imidazole,
1-phenyl-2-mercapto-5-(3'-pyridyl)-imidazole,
1-benzyl-2-mercapto-5-(3'-pyridyl)-imidazole,
1-phenethyl-2-mercapto-5-(3'-pyridyl)-imidazole,
1-(o-chlorophenyl)-2-mercapto-5-(3'-pyridyl)-imidazole,
1-(p-chlorophenyl)-2-mercapto-5-(3'-pyridyl)-imidazole,
1-(o-methylphenyl)-2-mercapto-5(3'-pyridyl)-imidazole,
1-(m-methylphenyl)-2-mercapto-5-(3'-pyridyl)-imidazole, 1-(p-methylphenyl)-2-mercapto-5-(3'-pyridyl)-
  imidazole,
1-(o-methoxyphenyl)-2-mercapto-5-(3'-pyridyl)-
  imidazole,
1-(m-methoxyphenyl)-2-mercapto-5-(3'-pyridyl)-
  imidazole,
1-(p-methoxyphenyl)-2-mercapto-5-(3'-pyridyl)-
  imidazole,
1-allyl-2-mercapto-5-(3'-pyridyl)-imidazole,
1-ethyl-2-mercapto-5-(3'-pyridyl)-imidazole, and
1-n-propyl-2-mercapto-5-(3'-pyridyl)-imidazole.

References Cited
UNITED STATES PATENTS

| | | | |
|---|---|---|---|
| 3,505,350 | 4/1970 | Doebel et al. | 260—294.8 G |
| 3,622,584 | 11 1971 | Doebel et al. | 260—294.8 G |
| 3,629,473 | 12/1971 | Doebel et al. | 260—294.8 G |

ALAN L. ROTMAN, Primary Examiner

U.S. Cl. X.R.

424—263